United States Patent
Meschia

(10) Patent No.: US 6,682,337 B2
(45) Date of Patent: Jan. 27, 2004

(54) DEVICE FOR EJECTING ARTICLES FOR AN INJECTION MOULDING MACHINE FOR PLASTICS

(75) Inventor: Maurilio Meschia, Usmate (IT)

(73) Assignee: Negri Bossi S.p.A., Cologno Monzese (IT)

( * ) Notice: Subject to any disclaimer, the term of this patent is extended or adjusted under 35 U.S.C. 154(b) by 154 days.

(21) Appl. No.: 09/924,480

(22) Filed: Aug. 9, 2001

(65) Prior Publication Data

US 2002/0110616 A1 Aug. 15, 2002

(30) Foreign Application Priority Data

Feb. 13, 2001 (EP) ............................................. 01830090

(51) Int. Cl.[7] .......................... B29C 45/42; B29C 45/66
(52) U.S. Cl. .................... 425/556; 425/444; 425/451.6; 425/593
(58) Field of Search ................................. 425/236, 556, 425/451.6, 444, 589, 592, 593, 577

(56) References Cited

U.S. PATENT DOCUMENTS

| | | | | | |
|---|---|---|---|---|---|
| 2,416,348 A | * | 2/1947 | Renier | .......................... | 425/550 |
| 3,418,684 A | * | 12/1968 | Collins | ........................ | 425/156 |
| 3,702,750 A | * | 11/1972 | Veneria | ........................ | 425/130 |
| 3,807,682 A | | 4/1974 | Catinella et al. | .............. | 249/68 |
| 3,854,856 A | * | 12/1974 | Herbst et al. | ................ | 425/173 |
| 4,243,369 A | * | 1/1981 | James | ........................ | 425/451.2 |
| 4,273,524 A | * | 6/1981 | Smith | ........................ | 425/450.1 |
| 5,332,382 A | * | 7/1994 | Kasai et al. | ................. | 425/145 |
| 6,334,765 B1 | * | 1/2002 | Ellinger | ........................ | 425/149 |
| 6,364,655 B1 | * | 4/2002 | Wang | ......................... | 425/589 |
| 6,478,566 B1 | * | 11/2002 | Ito et al. | ...................... | 425/154 |

FOREIGN PATENT DOCUMENTS

| | | |
|---|---|---|
| DE | 961 395 | 4/1957 |
| DE | 2410446 | 9/1974 |
| FR | 1.256.050 | 6/1961 |
| JP | 2000263602 | 9/2000 |
| WO | WO 01/58659 A1 | 8/2001 |

* cited by examiner

Primary Examiner—Joseph Drodge
Assistant Examiner—Emmanuel Luk
(74) Attorney, Agent, or Firm—Nixon & Vanderhye P.C.; Frank P. Presta

(57) ABSTRACT

An ejector device (200) for ejecting articles for injection molding machines for plastic materials comprising a movable mold-holding plate (13) supporting a mold half (20) defining a profile whereon a molded article (21) is formed, and moved by a double toggle mechanism comprising connecting rods (18) connected to the movable mold-holding plate (13); the device (200) for ejecting articles comprising a movable ejector plate (3) supported in translation by means of supporting columns (4) fixed to the movable mold-holding plate (13), and a pin (2) connected to the movable ejector plate (3) and acting on an ejector table (1) arranged into a mold half cavity (51) to favor ejection of the molded article (21), the movable ejector plate (3) being moved by means of lever mechanism driven by a ball screw (35) actuated by an electric motor (40).

6 Claims, 3 Drawing Sheets

DEVICE FOR EJECTING ARTICLES FOR AN INJECTION MOULDING MACHINE FOR PLASTICS

BACKGROUND OF THE INVENTION

The present invention refers to an ejector device for ejecting moulded articles on injection moulding machines for plastic materials.

FIELD OF THE INVENTION

According to the prior art, injection moulding machines or devices are used in the injection moulding procedure in which resins, consisting of plastic materials, are heated to be brought to a molten state in a heating cylinder and are injected at high pressure into a cavity of a mould so as fill it. The resin in the molten state is cooled inside the mould so as to harden and form the moulded product which can be taken to storage or to subsequent processing stages.

The injection moulding device comprises an injection assembly and a moulding assembly. The injection assembly consists of a cylinder heated externally by means of electrical resistors and containing a plasticization screw. The plasticization screw performs two functions: by means of rotation it conveys and plasticizes the material in the front part of the cylinder; by translating axially it transfers the material, by now in the molten state, from the cylinder into the mould.

In particular the moulding assembly comprises a mould generally consisting of two mould halves mounted respectively on a fixed plate and on a movable plate. In this manner the mould can be opened and closed by advancing or retracting the movable plate. The moulding cavity is defined between the fixed mould half and the movable mould half.

The movable plate of the mould half is moved by a double toggle mechanism which imparts the necessary movements as rapidly as possible and guarantees the closing force of the mould to balance the thrust of the plastic material during injection.

Again in the moulding assembly, there is integrated an ejector device for ejection of moulded articles which provides for ejection thereof when the mould is opened.

Various types of devices for ejection of the articles exist, such as mechanical, hydraulic or pneumatic ejectors or ejector systems based on blowing. On account of their simplicity and versatility, electrical actuating or driving systems are generally preferred for movement of the devices for ejection of moulded articles.

With reference to FIGS. 1 and 2, a prior art electric ejector device, designated as a whole by reference numeral 100, is illustrated schematically.

A mould half 20 has a profile on which a moulded article 21 is formed. The mould half 20 is mounted on a movable mould-holding plate 13 with a substantially rectangular shape. The movable mould-holding plate 13 is supported in translation by means of four guide columns 14. The guide columns 14 are disposed near the four corners of the movable mould-holding plate 13 and are at right angles thereto. The guide columns 14 are part of the fixed frame of the injection assembly.

The movable mould-holding plate 13 is moved by connecting rods 18 forming part of a double toggle mechanism which is per se known and is therefore not illustrated in greater detail.

The ejector device 100 is situated in the rear part of the movable mould-holding plate 13, in a central position between the columns 14 and on the inside with respect to the area of connection of the connecting rods 18 of the double toggle mechanism.

The ejector device 100 acts, by means of ejector pins 2, on an ejector table 1 disposed inside a cavity 51 of the mould half 20. The ejector table 1 provides rods 52 in register with through holes formed in the mould half 20. In this manner the translational movement of the table 1 in the cavity 51 causes the rods 52 to advance until they abut against the surface of the moulded article 21, causing detachment thereof from the profile of the mould half 20.

The pins 2 are fixed on a movable plate 3, hereinafter called the movable ejector plate 3 since it is part of the ejector device 100. The movable ejector plate 3 is supported in translation by means of supporting columns 4. The supporting columns 14 are fixed at one end thereof to the movable mould-holding plate 13 and at the other end to a supporting plate 9 supported in translation by guide columns 4 of the machine frame. In this manner the supporting plate 9 can move integrally with the movable mould-holding plate 13.

Movement of the movable ejector plate 3 takes place by means of two ball screws 5 driven by means of an electric motor 10. The shanks of the ball bearing screws 5 engage inside respective nut screws 6 fixedly mounted in the movable ejector plate 3. Each ball screw 5 is pivotally supported at its ends by bearings 7 and 8 disposed respectively on the supporting plate 9 and on the movable mould-holding plate 13.

The electric motor 10 is supported by a base 23 fixed in the rear part of the supporting plate 9. In this manner the motor 10 moves integrally with the supporting plate 9 during opening and closing of the mould. As shown in FIG. 2, the electric motor 10 is disposed between two guide columns 14 and protrudes outward and sideways from the supporting plate 9.

In the rear part of the supporting plate 9 two idler rollers 11 and two pulleys 12 splined to the ball screws 5 are provided. The electric motor 10 drives a toothed belt 24 that travels on the two idler rollers 11 and engages on the pulleys 12 setting the ball screws 5 in rotation. The motor 10 is controlled by a control or actuator means able to control forward and backward translation of the ejector pins according to a pre-established law of motion, in accordance with the moment in which a moulded article must be ejected from the cavity 21 of the mould half.

The ejector device according to the prior art, described above, has various drawbacks due mainly to its size, which precludes positioning thereof in the space within the guide columns 14 of the moulding assembly construction.

The electrical driving mechanism based on ball screws in fact requires a larger volume of space with respect to that necessary for an oleodynamic system with a similar performance. In particular the electric motor capable of developing, by means of the ball bearing screws, the necessary thrusts for ejection of articles in medium-sized machines, proves to have a size that is not compatible with the other parts of the ejector device.

Moreover the ejector device 100 has drawbacks due to the fact that the drive system for the ball screws is related to the use of toothed belts which require continual adjustments to ensure a correct transmission of torque.

SUMMARY OF THE INVENTION

The object of the present invention is to eliminate the drawbacks of the prior art, providing a device for ejection of moulded articles that ensures optimal performance and at the same time is practical, versatile, economical and simple to make.

An article ejector device for ejecting articles, for injection moulding machines for plastic materials according to the invention has a movable ejector plate connected to a pin that acts on an ejector table disposed inside a cavity of a mould half supported by a movable mould-holding plate. The movable ejector plate is driven by a lever mechanism comprising at least one lever having its resistance arm hinged to the movable plate, its power arm hinged to driving means and a fulcrum pivoted in at least one connecting rod of a double toggle mechanism for movement of the movable mould-holding plate.

The driving means for the lever mechanism preferably comprises an electric motor in direct drive on a screw which engages a nut screw on which the power arm of the levers is hinged. Said drive or actuation system for the ejector device according to the invention proves extremely advantageous. In fact the electric motor can be positioned in the area beneath the plane of translation of the movable mould half. Exploitation of this area for positioning of the motor proves very advantageous because said area is free from moving parts, is readily accessible to the user and is inside the space conventionally occupied by the machine.

Moreover, the fact of providing an electric motor in direct drive with a screw allows some of the drawbacks due to the use of toothed belts of the prior art to be eliminated.

BRIEF DESCRIPTION OF THE DRAWINGS

Further characteristics of the invention will be made clearer by the detailed description that follows, referring to a purely exemplary and therefore non-limiting embodiment thereof, illustrated in the appended drawings in which.

DETAILED DESCRIPTION OF THE INVENTION

Figure 1:
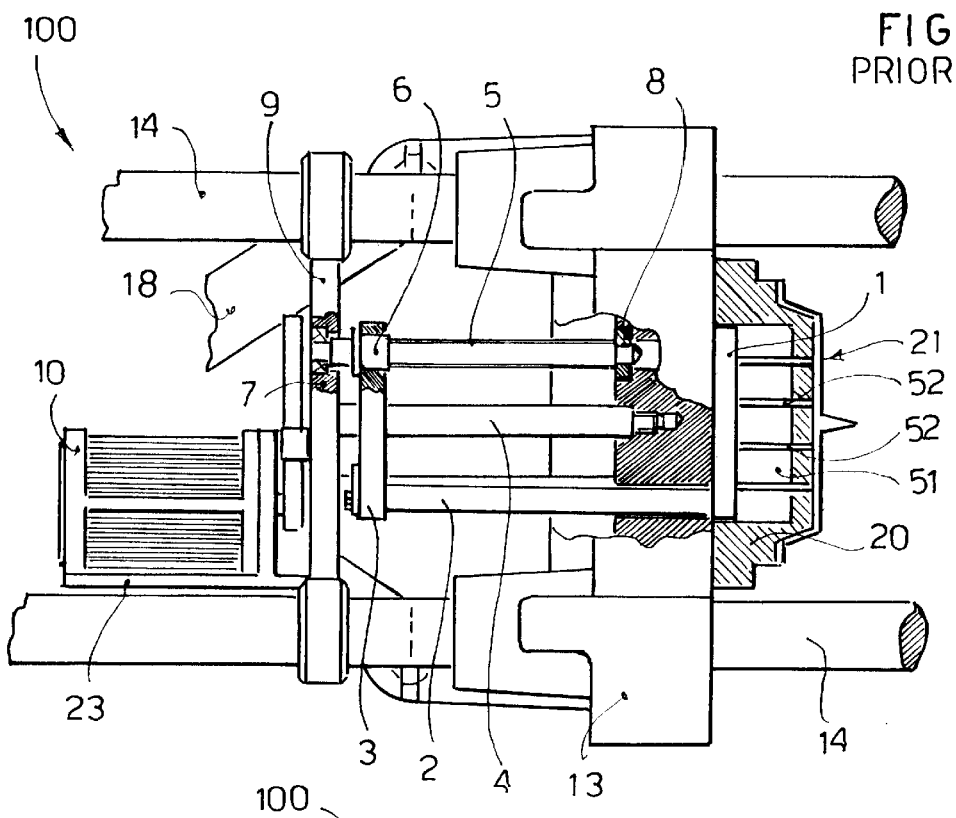
FIG. 1 is a broken-away part-sectional side elevational view, illustrating a prior art ejector device, applied to a mould half mounted on a movable mould-holding plate.
Figure 2:
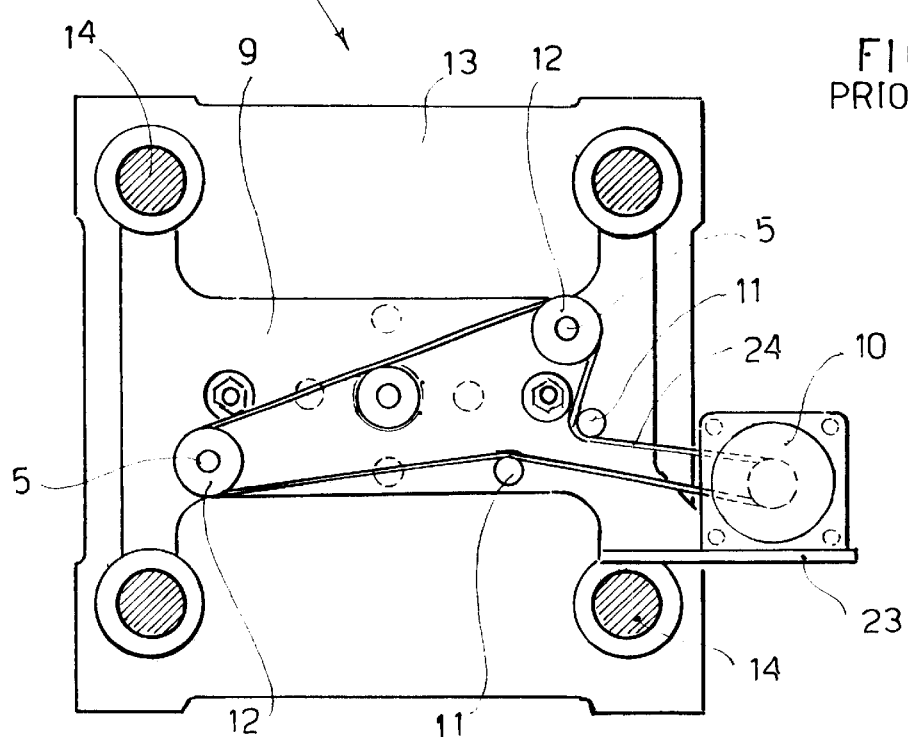
FIG. 2 is a rear elevational view (from the left in FIG. 1) of the ejector device of FIG. 1.
Figure 3:
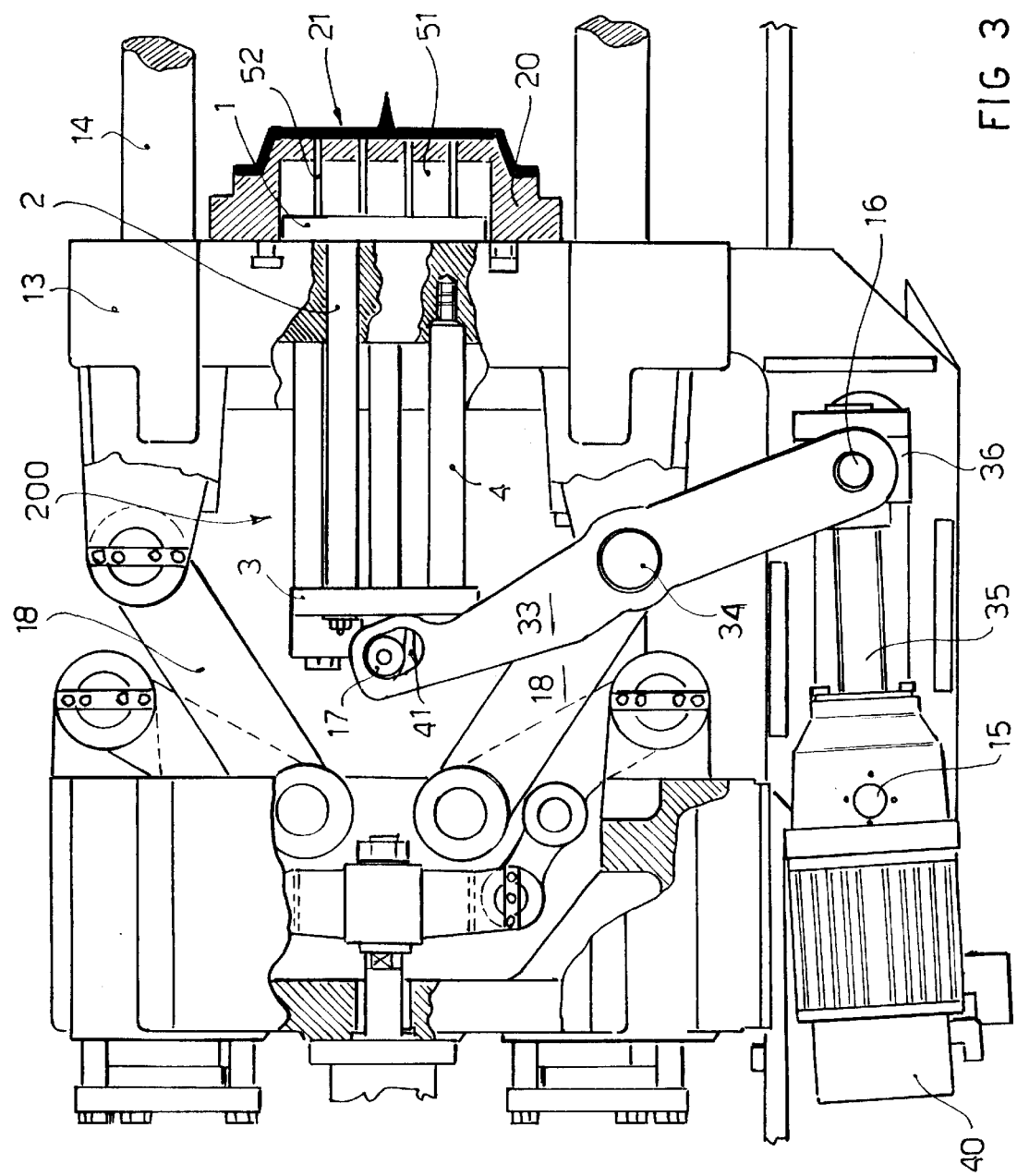
FIG. 3 is a view like FIG. 1, illustrating an article ejector device according to the invention.
Figure 4:
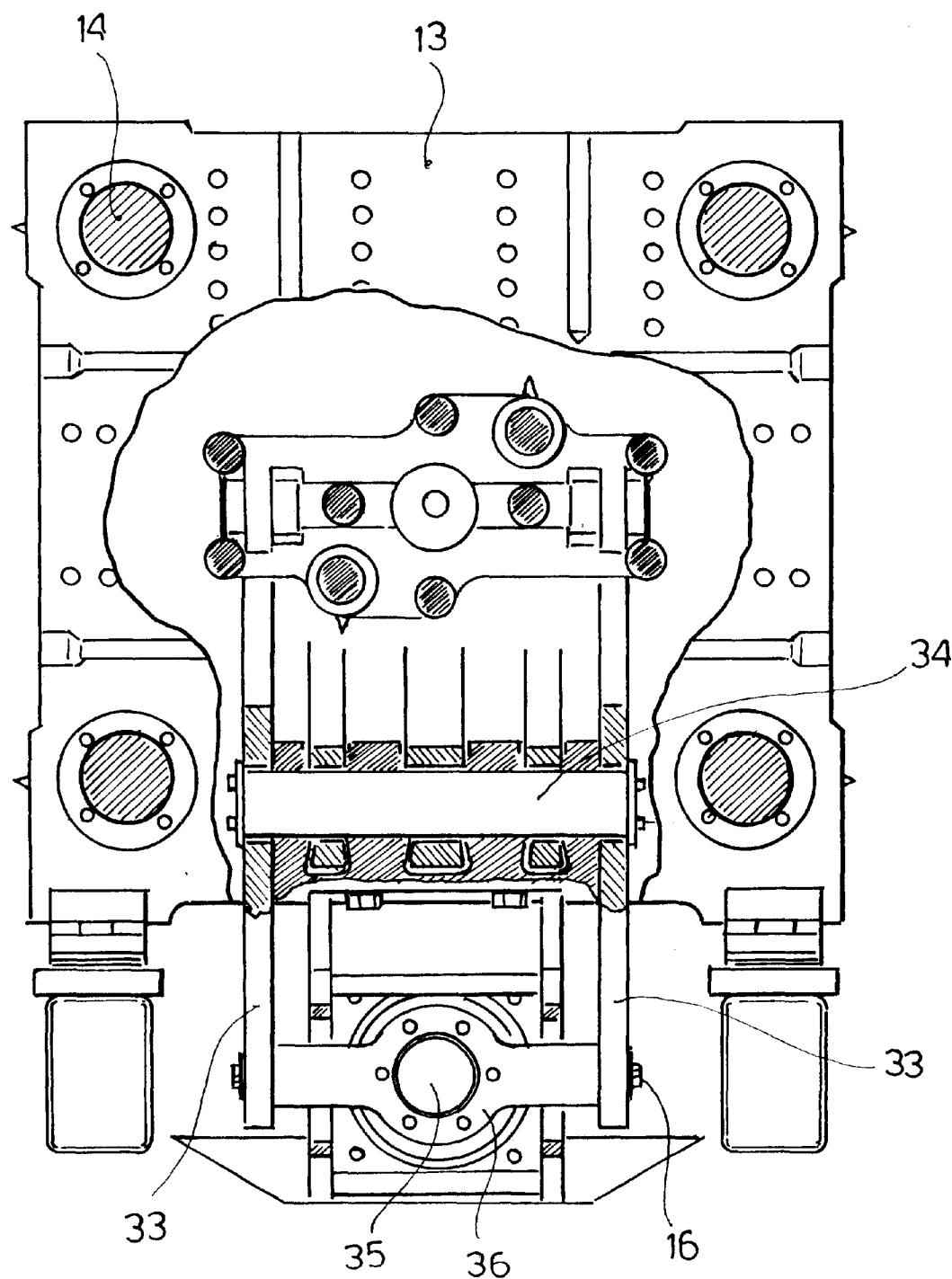
FIG. 4 is a part-sectional front elevational view (from the right in FIG. 3) of the ejector device of FIG. 1.

An ejector device for moulded bodies or articles, designated as a whole with reference numeral 200, is described with the aid of FIGS. 3 and 4. Elements like or corresponding to those illustrated in FIGS. 1 and 2, relating to the prior art ejector device 100, are designated with the same reference numerals and the detailed description thereof is omitted.

The ejector device 200, like prior art ejector device 100, has an ejector plate 3 with a plurality of ejector pins 2 acting on ejector table 1 positioned in the cavity 51 of the mould half 20. The ejector plate 3 can translate supported on two or more supporting columns 4 fixed at one end thereof to the movable mould-holding plate 13.

In a different way from the prior art device 100, movement of the ejector plate 3 of the ejector device 200 according to the invention takes place by means of a lever mechanism moved by a ball screw 35 actuated by an electric motor 40. Said lever mechanism has two levers 33 disposed at the two sides of the ejector plate 3.

Each lever 33 has at one end, in its resistance arm, a slot-type seat 41 able to house a hinge 17 integral with the movable ejector plate 3. In their fulcrum position, half-way along their length, the levers 33 are pivoted to the movable mould holding plate 13 by means of a gudgeon 34 disposed transversally. The gudgeon 34 is the hinge connecting the connecting rods 18 of the bottom part of the double toggle drive mechanism of the movable mould-holding plate 13. At the other end, in the power arm, each lever 33 is hinged by means of a thrust pin 16 to a nut screw 36 which engages the ball screw 35.

The electric motor 40 is connected in direct drive to the ball screw 35. In this manner the motor 40, by setting in rotation the ball screw 35, causes translation of the nut screw 36. Thus the pin 16 of the nut screw 36 acts on the levers 33. Consequently the levers 33 rotate about the fulcrum 34. The rotary motion of the levers 33 is converted into translational motion near the hinges 17 of the movable ejector plate 3 connected to slot-type seats 41 of the levers 33. As a result the movable plate 3 performs a horizontal translation and the pin 2 acts on the ejector table 1 which ejects an article 21 from the profile of the mould half 20.

Since the levers 33 are pivoted in 34 to the movable mould holding plate 13 of the double toggle mechanism, they prove to be integral with the horizontal travelling movement of the movable mould-holding plate 13. Thus the electric motor 40 which is in direct drive with the ball bearing screw 35 the nut screw 36 of which is hinged at 16 to the levers 33, must be able to follow both the rotary motion of the levers 33 around their fulcrum 34 and the translational motion of the levers 33 which follow the translation of the movable mould holding plate 13. For this reason the electric motor 40 is horizontally pivoted on a supporting pin 15. The supporting pin 15 is hinged to a mobile part of the machine frame which moves integrally with the movable mould-holding plate 13.

Use of the levers 33 allows the motor 40 to be positioned in the area beneath the plane of translation of the movable mould half 20, that is to say beneath the lower end of the movable mould-holding plate 13. Exploitation of this area for positioning of the motor is very advantageous because said area is free from moving parts, is readily accessible to the user and is within the space conventionally occupied by the machine.

Numerous variations and changes of detail within the reach of a person skilled in the art can be made to the present embodiment of the invention without departing from the scope of the invention, expressed by the appended claims.

What is claimed is:

1. An ejector device for ejecting articles for injection moulding machines for plastic materials, said injecting moulding machine comprising:
   a mould half (20) defining a profile whereon a moulded article (21) is formed,
   a movable mould-holding plate (13) supporting said mould half (20), and
   a double toggle mechanism comprising connecting rods (18) connected to said movable mould-holding plate (13) for translational movement thereof, said device (200) for ejecting articles comprising:
      a movable ejector plate (3) supported in translation by means of supporting columns (4) fixed to said movable mould-holding plate (13), and
      a pin (2) connected to said movable ejector plate (3) and acting on an ejector table (1) to favour ejection of the moulded article (21) from said profile of the mould half (20), characterized in that it comprises a lever mechanism for translational movement of said movable ejector plate (3), said lever mechanism comprising at least one lever (33) which provides a resistance arm hinged to said movable ejector plate (3), a power arm hinged to actuator means, and a fulcrum pivoted in said movable mould-holding plate (13);

said actuator means of the movable ejector plate (3) comprising an electric motor (40) which rotates a screw (35) which engages a nut screw (36) hinged by means of pins (16) to the power arm of said at least one lever (33).

2. An ejector device (200) according to claim 1, characterized in that said screw (35) is a ball screw.

3. An ejector device (200) according to claim 1, characterized in that said electric motor (40) is pivoted on a supporting pin (15), fixed to a part integral with the movable mould-holding plate (13).

4. An ejector device (200) according to claim 1, characterized in that said electric motor (40) is mounted beneath the lower plane of translation of the movable mould-holding plate (13).

5. An ejector device (200) according to claim 1, characterized in that said at least one lever (33) has a slot-shaped seat (41) in the resistance arm such as to engage with a respective hinge (17) provided on said movable ejector plate (3).

6. An ejector device for ejecting articles for injection moulding machines for plastic materials, said injecting moulding machine comprising:

a mould half (20) defining a profile whereon a moulded article (21) is formed, a movable mould-holding plate (13) supporting said mould half (20), and a double toggle mechanism comprising connecting rods (18) connected to said movable mould-holding plate (13) for translational movement thereof, said device (200) for ejecting articles comprising:

a movable ejector plate (3) supported in translation by means of supporting columns (4) fixed to said movable mould-holding plate (13), and a pin (2) connected to said movable ejector plate (3) and acting on an ejector table (1) to favour ejection of the moulded article (21) from said profile of the mould half (20), characterized in that it comprises a lever mechanism for translational movement of said movable ejector plate (3), said lever mechanism comprising at least one lever (33) which provides a resistance arm hinged to said movable ejector plate (3), a power arm hinged to actuator means, and a fulcrum pivoted in said movable mould-holding plate (13);

said double toggle mechanism having a pair of upper connecting rods (18) and a pair of lower connecting rods (18), and said lever (33) being pivoted in its fulcrum by means of a gudgeon (34) coinciding with the hinge axis of the pair of lower connecting rods (18) of the double toggle mechanism on the movable mould-holding plate (13).

* * * * *